United States Patent
Asano

(10) Patent No.: US 9,032,351 B2
(45) Date of Patent: May 12, 2015

(54) SEMICONDUCTOR DEVICE DESIGN METHOD AND DESIGN APPARATUS

(71) Applicant: Fujitsu Semiconductor Limited, Yokohama-shi, Kanagawa (JP)

(72) Inventor: Hironori Asano, Akiruno (JP)

(73) Assignee: Fujitsu Semiconductor Limited, Kawasaki (JP)

( * ) Notice: Subject to any disclaimer, the term of this patent is extended or adjusted under 35 U.S.C. 154(b) by 0 days.

(21) Appl. No.: 14/132,428

(22) Filed: Dec. 18, 2013

(65) Prior Publication Data

US 2014/0215423 A1    Jul. 31, 2014

(30) Foreign Application Priority Data

Jan. 30, 2013    (JP) ................. 2013-015030

(51) Int. Cl.
   *G06F 17/50*    (2006.01)
(52) U.S. Cl.
   CPC ........ *G06F 17/5068* (2013.01); *G06F 2217/62* (2013.01); *G06F 2217/82* (2013.01)
(58) Field of Classification Search
   CPC .................................. G06F 17/30; G06F 17/50
   USPC ........................................................ 716/113
   See application file for complete search history.

(56) References Cited

U.S. PATENT DOCUMENTS

| | | | | |
|---|---|---|---|---|
| 7,603,639 | B2 * | 10/2009 | Pakbaz et al. ............. | 716/108 |
| 2004/0109375 | A1 | 6/2004 | Arai et al. | |
| 2006/0220751 | A1 | 10/2006 | Nakashiba et al. | |
| 2008/0092090 | A1 | 4/2008 | Miyahara et al. | |
| 2011/0176597 | A1 * | 7/2011 | Kishi ......................... | 375/226 |
| 2014/0002183 | A1 * | 1/2014 | Iyer et al. .................. | 327/564 |

FOREIGN PATENT DOCUMENTS

| | | |
|---|---|---|
| JP | 2004-186520 | 7/2004 |
| JP | 2006-277557 | 10/2006 |
| JP | 2008-118098 | 5/2008 |
| JP | 2009-282916 | 12/2009 |
| JP | 2011-151100 | 8/2011 |
| KR | 10-2011-0085916 | 7/2011 |

OTHER PUBLICATIONS

Patent Abstracts of Japan, Publication No. 2004-186520, Published Jul. 2, 2004.
Patent Abstracts of Japan, Publication No. 2006-277557, Published Oct. 12, 2006.

(Continued)

*Primary Examiner* — Vuthe Siek
*Assistant Examiner* — Mohammed Alam
(74) *Attorney, Agent, or Firm* — Staas & Halsey LLP

(57) ABSTRACT

A relationship between distance from a back bias control section which outputs a control signal for controlling a back bias of a transistor and an amount of noise in the control signal outputted from the back bias control section is found. An increase of jitter corresponding to the amount of the noise in a clock transmitted on a clock path connected to a circuit section (IP macro) is found on the basis of the relationship between the distance from the back bias control section and the amount of the noise. The circuit section and the clock path are placed on the basis of the increase of the jitter and an allowable jitter value for the circuit section.

21 Claims, 14 Drawing Sheets

(56) References Cited

OTHER PUBLICATIONS

Patent Abstracts of Japan, Publication No. 2008-118098, Published May 22, 2008.
Patent Abstracts of Japan, Publication No. 2011-151100, Published Aug. 4, 2011.
K. Fujita et al., "Advanced Channel Engineering Achieving Aggressive Reduction of $V_T$ Variation for Ultra-Low-Power Applications," Electronic Device Meeting (IEDM), 2011 IEEE International, Dec. 5-7, 2011, 4 pages.
Korean Office Action dated Jan. 20, 2015 in corresponding Korean Patent Application No. 10-2013-0168641.

* cited by examiner

| IP MACRO | ALLOWABLE JITTER VALUE |
|---|---|
| IP1 | 50ps |
| IP2 | 156ps |
| ⋮ | ⋮ |
| IP6 | 2000ps |

FIG. 11

| IP MACRO | ALLOWABLE JITTER VALUE FOR IP MACRO | DISTANCE BETWEEN CHARGE PUMP AND PLL | DISTANCE BETWEEN PLL AND IP MACRO | JITTER AMOUNT | ALLOWABLE INPUT JITTER | DETERMINATION |
|---|---|---|---|---|---|---|
| IP MACRO 43 | 200ps | 2mm | 1mm | 100ps | 100ps | OK |
| | | | 2mm | 150ps | 50ps | OK |
| | | 1mm | 1mm | 200ps | 0ps | ERROR |
| | | | 2mm | 250ps | -50ps | ERROR |

SEMICONDUCTOR DEVICE DESIGN METHOD AND DESIGN APPARATUS

CROSS-REFERENCE TO RELATED APPLICATION

This application is based upon and claims the benefit of priority of the prior Japanese Patent Application No. 2013-015030, filed on Jan. 30, 2013, the entire contents of which are incorporated herein by reference.

FIELD

The embodiments discussed herein are related to a semiconductor device design method and a design apparatus.

BACKGROUND

With an SoC (System-on-a-Chip) various types of signal processing are performed by one chip. Accordingly, an SoC includes various IP (Intellectual Property) macros such as high-speed interface I/O (Input/Output) and an ADC (Analog to Digital Converter)/DAC (Digital to Analog Converter). A PLL (Phase Locked Loop) is used as a supplier of an input clock which operates each IP macro. However, clock routing from the PLL to each IP macro is complex, so power consumption increases.

In recent years attention has been riveted on DDC (Deeply Depleted Channel) transistors which operate at low voltage. With DDC transistors, for example, a back bias is controlled by a charge pump circuit. This mikes it possible to operate at low voltage while decreasing a leakage current.

Japanese Laid-open Patent Publication No. 2006-277557
Japanese Laid-open Patent Publication No. 2008-118098

By the way, the restriction of allowable jitter is placed on an input clock to each IP macro. A clock path is placed so as to meet this restriction. However, noise produced at the time of control of a back bias of a DDC transistor included in a clock buffer on the clock path causes an increase in the amount of jitter. As a result, the restriction of allowable jitter may fail to be met.

SUMMARY

According to an aspect, there is provided a method for designing a semiconductor device including a circuit section, a clock path through which a clock is inputted to the circuit section, and a back bias control section which outputs at least a control signal for controlling a back bias of a transistor included in the clock path. This method includes finding, by a processor, a relationship between distance from the back bias control section which controls the back bias of the transistor and an amount of noise in the control signal outputted from the back bias control section; finding, by the processor, an increase of jitter in the clock transmitted on the clock path connected to the circuit section on the basis of the relationship between the distance from the back bias control section and the amount of the noise, the increase of the jitter corresponding to the amount of the noise; and placing, by the processor, the circuit section and the clock path on the basis of the increase of the jitter and an allowable jitter value for the circuit section.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is an example of an allowable jitter value for an IP macro of each type;

FIG. 12 is an example of a table indicative of results obtained by calculating allowable input jitter;

DESCRIPTION OF EMBODIMENTS

Figure 1:
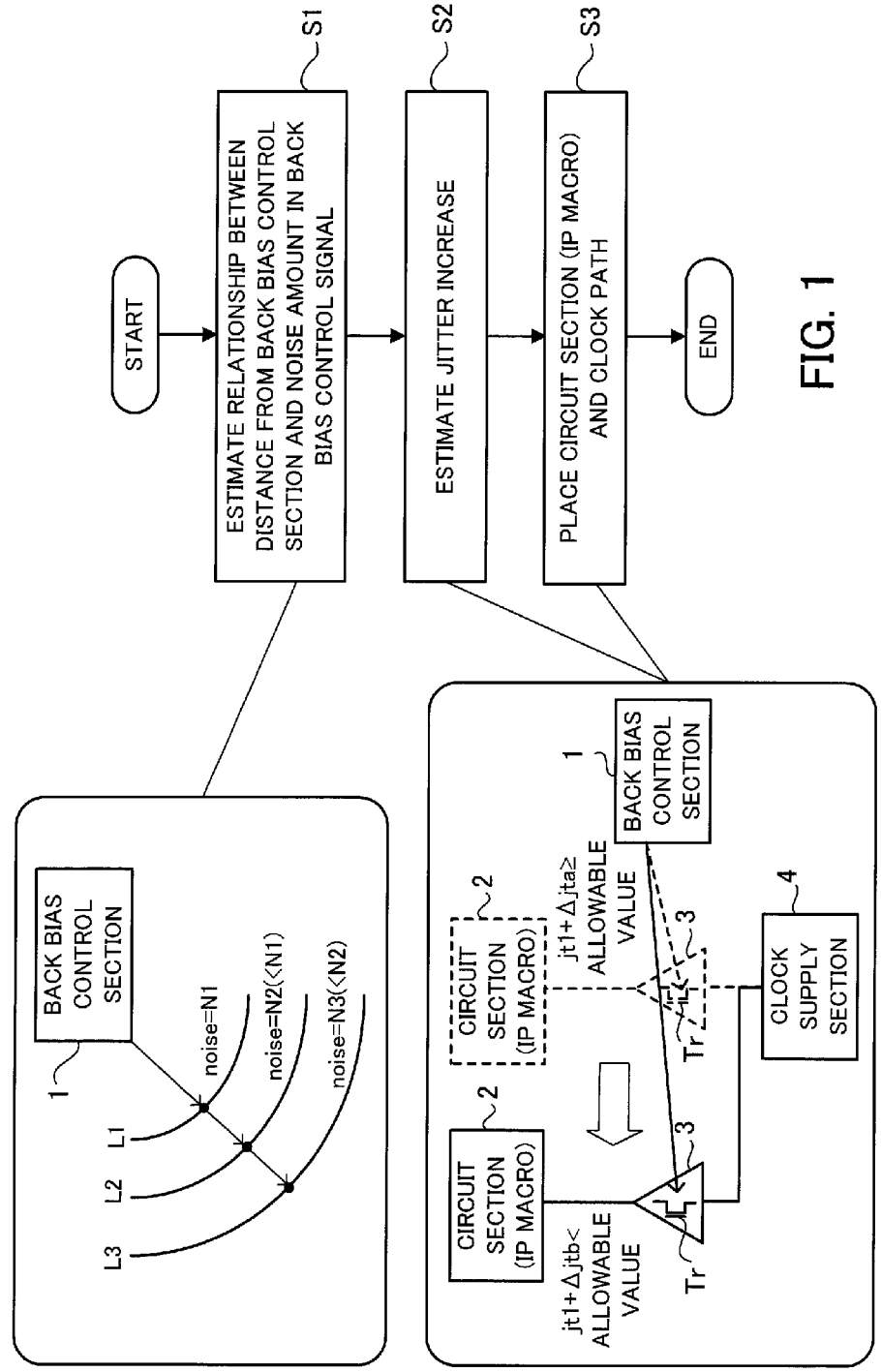
FIG. 1 is a view for describing an example of a semiconductor device design method according to a first embodiment.

Embodiments will now be described with reference to the accompanying drawings, wherein like reference numerals refer to like elements throughout.

(First Embodiment)

FIG. 1 is a view for describing an example of a semiconductor device design method according to a first embodiment.

Figure 2:
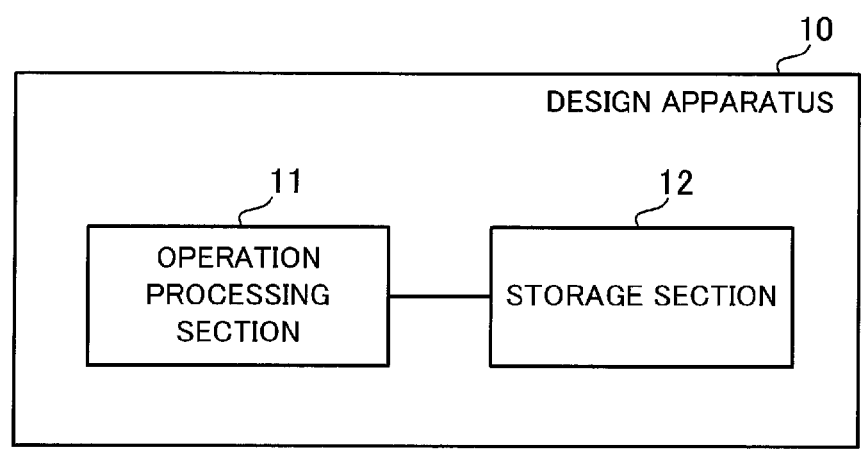
FIG. 2 is an example of a design apparatus which realizes the semiconductor device design method according to the first embodiment.

Furthermore, FIG. 2 is an example of a design apparatus which realizes the semiconductor device design method according to the first embodiment.

A design apparatus 10 includes an operation processing section 11 and a storage section 12. On the basis of a program and data stored in the storage section 12, the operation processing section 11 realizes a method for designing a semiconductor device (SoC, for example) like that illustrated in FIG. 1. The operation processing section 11 is, for example, a processor like that described later.

First a relationship between distance from a back bias control section 1 which controls a back bias of a transistor (above DDC transistor) in a chip and an amount of noise in a control signal outputted from the back bias control section 1 is estimated (step S1). Hereinafter a control signal outputted from the back bias control section 1 will be referred to as a back bias control signal. The back bias control section 1 may supply a back bias control signal not to all DDC transistors in the chip but to a part of the DDC transistors in the chip.

Noise included in the back bias control signal results in a variation of a back bias and decreases with an increase in distance from the back bias control section 1. As illustrated in FIG. 1, for example, an amount of noise (noise) is N1 at a distance of L1, noise=N2 (<N1) at a distance of L2 (>L1), and noise=N3 (<N2) at a distance of L3 (>L2). An amount of noise is estimated by the use of a simulation model based on the resistance of wirings and the parasitic capacitance of transistors (details will be described later).

Next, the operation processing section 11 finds an amount of noise from the relationship obtained in step S1 and estimates an increase of jitter based on the amount of noise on a clock path connected to a circuit section (hereinafter referred to as an IP macro) which performs a process for realizing a desired function (step S2). A clock buffer including a transistor whose back bias is controlled is placed on the clock path. The clock buffer is placed for keeping the amplitude of a clock at determined magnitude.

In step S2, for example, increases of jitter based on the amounts of noise N1 through N3 corresponding to the above distances L1 through L3 are found. At this time an increase of jitter based on a delay on the clock path (or the number of clock buffer stages) may be found (details will be described later).

Then the operation processing section 11 places the IP macro and the clock path on the basis of the increases of jitter and an allowable jitter value for the IP macro (step S3).

FIG. 1 illustrates an example of the placement of the back bias control section 1, an IP macro 2, a clock buffer 3 including a transistor Tr, and a clock supply section (PLL, for example) 4.

The transistor Tr is a DDC transistor. A DDC transistor has, for example, a channel structure including three regions. The three regions are a region which contains few impurities, an offset region which sets a threshold, and a screening region which blocks out electric charges. A threshold of the transistor Tr is set by a back bias control signal from the back bias control section 1.

In the example of FIG. 1, a total amount of jitter is jt1+Δjta in a case where the clock buffer 3 is placed at a position near the back bias control section 1 (at a position at a distance of L1 from the back bias control section 1, for example) and where the IP macro 2 is placed at a corresponding position. "jt1" is an amount of jitter in the clock supply section 4. "Δjta" is an increase of jitter on a clock path based on noise included in a back bias control signal. An amount of jitter in the clock supply section 4 changes according to the distance between the back bias control section 1 and the clock supply section 4 and this will be described later.

If the amount of jitter "jt1+Δjta" is greater than or equal to (or greater than) an allowable jitter value for the IP macro 2 as indicated in FIG. 1, then the operation processing section 11 places the IP macro 2 and the clock buffer 3 at positions where an amount of jitter is smaller than (or smaller than or equal to) the allowable jitter value.

In the example of FIG. 1, a total amount of jitter is "jt1+Δjtb" in a case where the clock buffer 3 is placed at a position more distant from the back bias control section 1 (at a position at a distance of L3 from the back bias control section 1, for example) and where the IP macro 2 is placed at a corresponding position, and is smaller than the allowable jitter value.

As in the above semiconductor device design method, a circuit section and a clock path are placed with an amount of noise in a back bias control signal which varies according to distance from the back bias control section 1 taken into consideration. This prevents violation of a restriction on jitter which otherwise occurs due to noise included in a back bias control signal.

Furthermore, in conventional design methods the placement of each IP macro in an SoC is determined by a use for a product. However, a clock path or jitter of an input clock to each IP macro is not verified. A problem is revealed when a really fabricated SoC is checked after design. Accordingly, if a problem is revealed, a large number of processes are performed over again. With the semiconductor device design method according to the first embodiment a circuit section and a clock path are placed with jitter taken into consideration. As a result, the number of processes performed over again is small and an increase in design period is restrained.

(Second Embodiment)

A semiconductor device design method will now be described in further detail.

Figure 3:
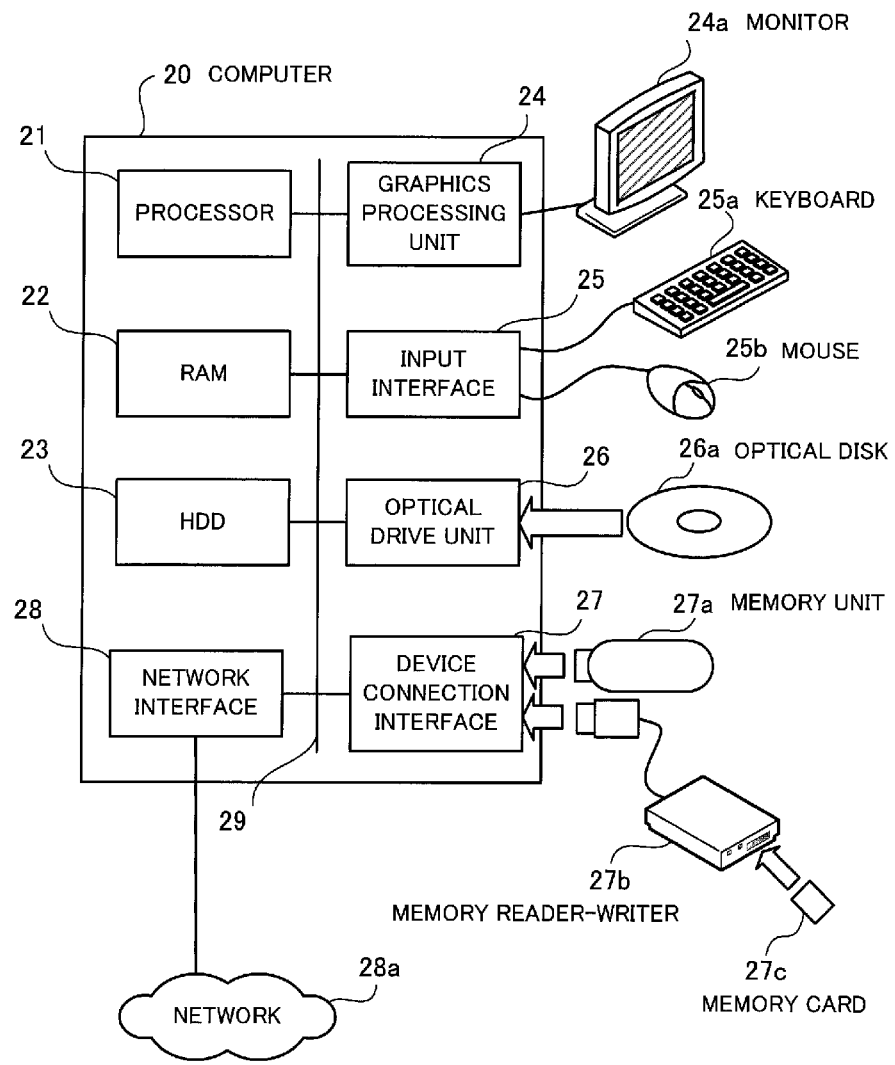
FIG. 3 is an example of hardware of a design apparatus (computer) which realizes a semiconductor device design method according to a second embodiment.

FIG. 3 is an example of hardware of a design apparatus (computer) which realizes a semiconductor device design method according to a second embodiment.

The whole of a computer 20 is controlled by a processor 21. A RAM (Random Access Memory) 22 and a plurality of peripheral devices are connected to the processor 21 via a bus 29. The processor 21 may be a multiprocessor. The processor 21 is, for example, a CPU (Central Processing Unit), an MPU (Micro Processing Unit), a DSP (Digital Signal Processor), an ASIC (Application Specific Integrated Circuit), or a PLD (Programmable Logic Device). Alternatively, the processor 21 may be a combination of two or more of a CPU, an MPU, a DSP, an ASIC, and a PLD.

A RAM 22 is used as main storage of the computer 20. The RAM 22 temporarily stores at least a part of an OS (Operating System) program or an application program executed by the processor 21. In addition, the RAM 22 stores various pieces of data which the processor 21 needs for performing a process.

Peripheral devices connected to the bus 29 are an HDD (Hard Disk Drive) 23, a graphics processing unit 24, an input interface 25, an optical drive unit 26, a device connection interface 27, and a network interface 28.

The HDD 23 magnetically writes data to and reads data from a built-in disk. The HDD 23 is used as auxiliary storage of the computer 20. The HDD 23 stores an OS program, application programs, and various pieces of data. A semiconductor memory, such as a flash memory, may be used as auxiliary storage.

A monitor 24a is connected to the graphics processing unit 24. In accordance with an instruction from the processor 21, the graphics processing unit 24 displays an image on a screen of the monitor 24a. The monitor 24a is a display using a CRT (Cathode Ray Tube), a liquid crystal display, or the like.

A keyboard 25a and a mouse 25b are connected to the input interface 25. The input interface 25 transmits to the processor 21 a signal transmitted from the keyboard 25a or the mouse 25b. The mouse 25b is an example of a pointing device and another pointing device may be used. Another pointing device is a touch panel, a tablet, a touch pad, a track ball, or the like.

The optical drive unit 26 uses laser light or the like for reading data recorded on an optical disk 26a. The optical disk 26a is a portable record medium on which data is recorded in a manner that enables reading by the reflection of light. The optical disk 26a is a DVD (Digital Versatile Disc), a DVD-RAM, a CD-ROM (Compact Disc Read-Only Memory), a CD-R(Recordable)/RW(ReWritable), or the like.

The device connection interface 27 is a communication interface for connecting a peripheral device to the computer 20. For example, a memory unit 27a or a memory reader-writer 27b is connected to the device connection interface 27. The memory unit 27a is a record medium including the function of communicating with the device connection interface 27. The memory reader-writer 27b writes data to or reads data from a memory card 27c. The memory card 27c is a card-type record medium.

The network interface 28 is connected to a network 28a. The network interface 28 transmits data to and receives data from another computer or a communication apparatus via the network 28a.

By adopting the above hardware configuration, processing functions in the second embodiment can be realized. The design apparatus 10 (see FIG. 2) described in the first embodiment can also be realized by the same hardware that makes up the computer 20 illustrated in FIG. 3.

The computer 20 realizes the processing functions in the second embodiment by executing a program recorded on, for example, a computer readable record medium. The program in which the contents of processes which the computer 20 is made to perform are described is recorded on various record media. For example, the program which the computer 20 is made to execute is stored in the HDD 23. The processor 21 loads into the RAM 22 at least a part of the program stored in the HDD 23, and executes it. Furthermore, the program which the computer 20 is made to execute may be recorded on a portable record medium such as the optical disk 26a, the memory unit 27a, or the memory card 27c. Under the control of, for example, the processor 21, the program recorded on a portable record medium is installed in the HDD 23 and is executed. In addition, the processor 21 may read out the program directly from a portable record medium and execute it.

Figure 4:
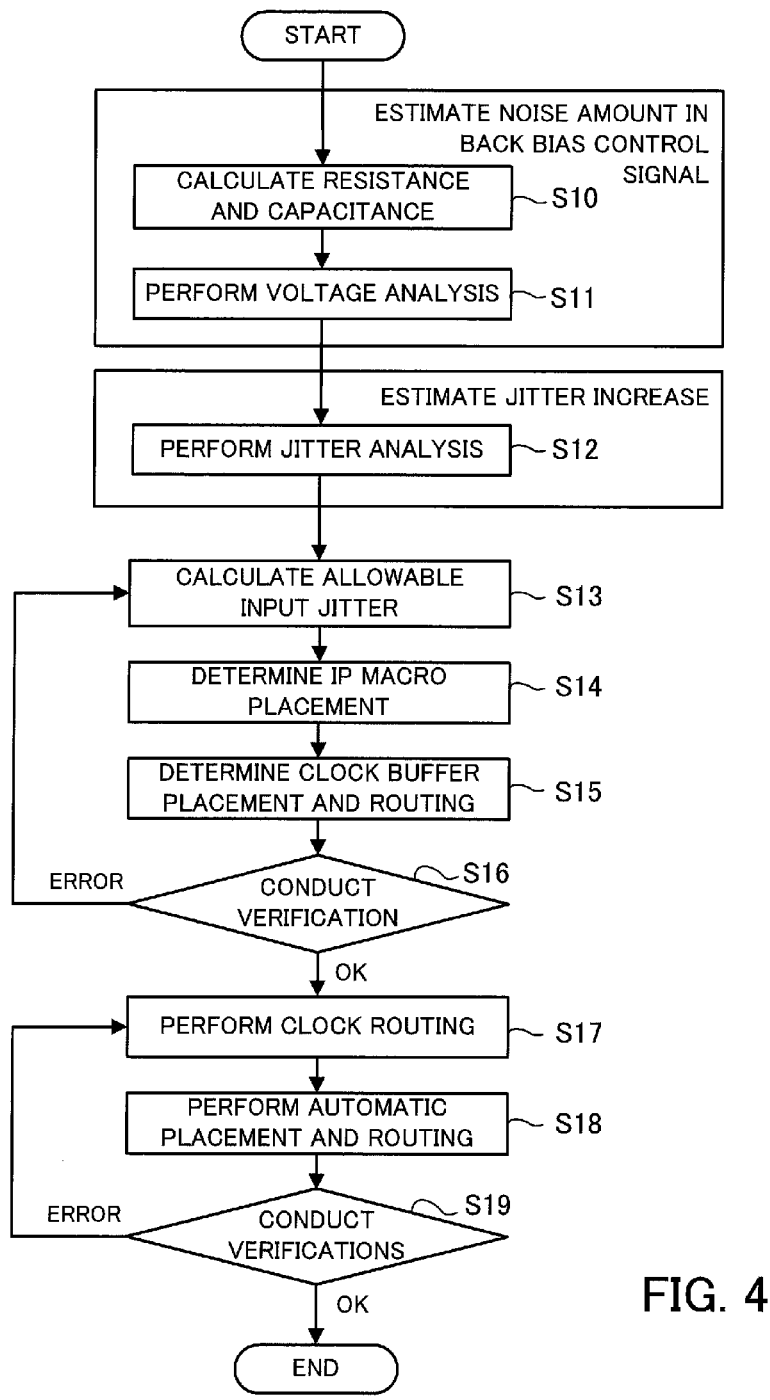
FIG. 4 is a flow chart of an example of the semiconductor device design method according to the second embodiment.

FIG. 4 is a flow chart of an example of the semiconductor device design method according to the second embodiment.

For example, the processor 21 included in the computer 20 illustrated in FIG. 3 reads out a semiconductor device design program from the HDD 23 and executes it. By doing so, each step described below is performed.

In steps S10 and S11, an amount of noise in a back bias control signal is estimated. First resistance and capacitance are calculated in step S10. At this time parasitic capacitance (capacitance of a well) of a transistor included in a clock buffer to be used and wiring resistance corresponding to the distance between the transistor and a charge pump which generates a back bias control signal are calculated. The charge pump is a circuit which performs the function of the back bias control section 1 illustrated in FIG. 1, and is an example of the back bias control section 1 illustrated in FIG. 1.

Figure 5:
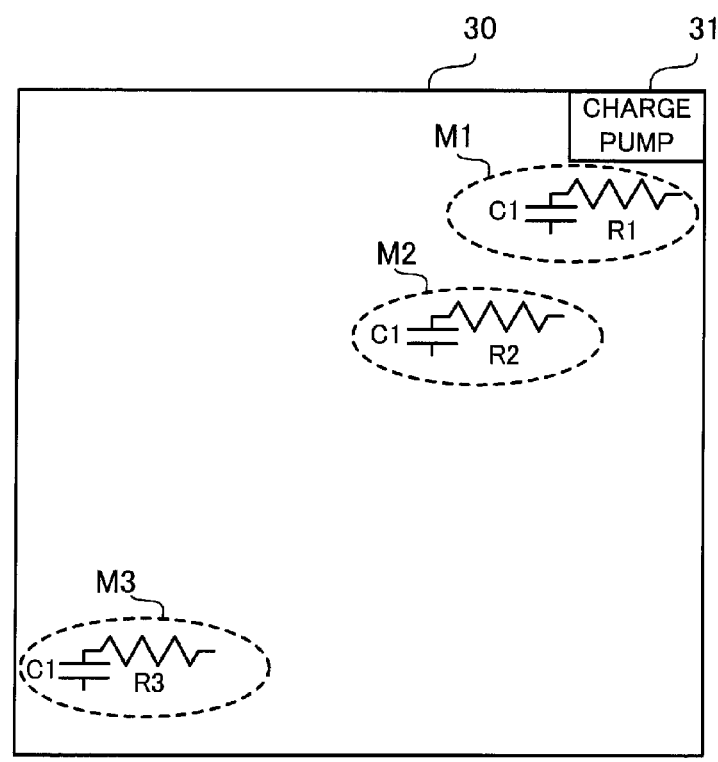
FIG. 5 is a view for describing an example of step S10.

FIG. 5 is a view for describing an example of step S10.

FIG. 5 illustrates an example in which a charge pump 31 is placed in a chip 30 and in which models M1, M2, and M3 that differ in distance from the charge pump 31 and that have resistances R1, R2, and R3, respectively, and a capacitance C1 are found in the chip 30. The capacitance C1 is the capacitance of a well in the transistor included in the clock buffer to be used. If the transistor is a p-channel transistor, then the capacitance C1 is the capacitance of an n-well. If the transistor is an n-channel transistor, then the capacitance C1 is the capacitance of a p-well.

The resistances R1, R2, and R3 are wiring resistances corresponding to distance from the charge pump 31 and the following relationships exist among them.

R1<R2<R3

The processor 21 calculates the above capacitance and resistance corresponding to distance on the basis of, for example, element information and wiring information stored in the HDD 23, and stores them in the HDD 23, the RAM 22, or the like.

A voltage analysis is performed in the next step S11. In this voltage analysis, an amount of noise in a back bias control signal corresponding to distance from the charge pump in the chip is found.

Figure 6:
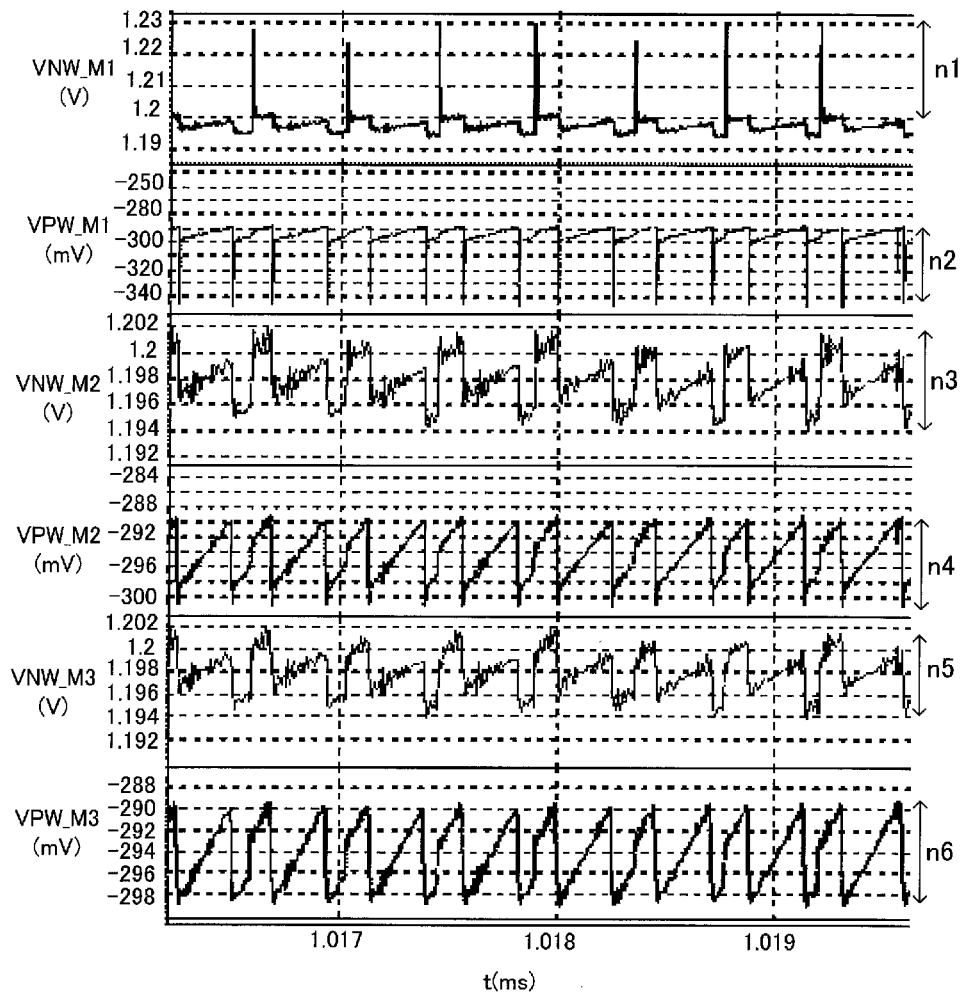
FIG. 6 is an example of results obtained by simulating a variation of a back bias Vbb.

FIG. 6 is an example of results obtained by simulating a variation of a back bias Vbb. FIG. 6 indicates a variation of a back bias Vbb at the time of using the models M1 through M3 illustrated in FIG. 5. In FIG. 6, a horizontal axis indicates time t (ms) and a vertical axis indicates voltage (V or mV) of a back bias Vbb.

If the DDC transistor is an n-channel transistor, then voltage of a back bias Vbb is negative. If the DDC transistor is a p-channel transistor, then voltage of a back bias Vbb is higher than power supply voltage VDD.

VNW_M1 (V) is a back bias Vbb obtained by the use of the model M1 in which the capacitance C1 is the capacitance of an n-well. VPW_M1 (mV) is a back bias Vbb obtained by the use of the model M1 in which the capacitance C1 is the capacitance of a p-well.

VNW_M2 (V) is a back bias Vbb obtained by the use of the model M2 in which the capacitance C1 is the capacitance of an n-well. VPW_M2 (mV) is a back bias Vbb obtained by the use of the model M2 in which the capacitance C1 is the capacitance of a p-well.

VNW_M3 (V) is a back bias Vbb obtained by the use of the model M3 in which the capacitance C1 is the capacitance of an n-well. VPW_M3 (mV) is a back bias Vbb obtained by the use of the model M3 in which the capacitance C1 is the capacitance of a p-well.

The resistances R1 through R3 are found on the assumption that the distance between the model M1 and the charge pump 31 is 0, that the distance between the model M2 and the charge pump 31 is 1.4 mm, and that the distance between the model M3 and the charge pump 31 is 5.6 mm. The capacitance C1 is found on the assumption that the size of the chip 30 is 7×7 mm.

With the model M1, a variation n1 of VNW_M1 is about 23 mV and a variation n2 of VPW_M1 is about 50 mV. Furthermore, with the model M2, a variation n3 of VNW_M2 is about 8 mV and a variation n4 of VPW_M2 is about 12 mV. In addition, with the model M3, a variation n5 of VNW_M3 is about 6 mV and a variation n6 of VPW_M3 is about 8 mV. These variations n1 through n6 represent the amounts of noise in a back bias control signal.

The processor 21 does simulations on the basis of information regarding a capacitance and a resistance corresponding to distance from the charge pump 31 found in step S10, and estimates the above relationship between distance from the charge pump 31 and an amount of noise. Then the processor 21 stores obtained information in the HDD 23, the RAM 22, or the like.

Next, a jitter analysis is performed in step S12 to estimate an increase of jitter on a clock path. In this jitter analysis an increase of jitter on a clock path connected to an IP macro is estimated on the basis of the clock buffer to be used and information regarding the relationship between distance from the charge pump 31 and an amount of noise found in step S11.

Figure 7:
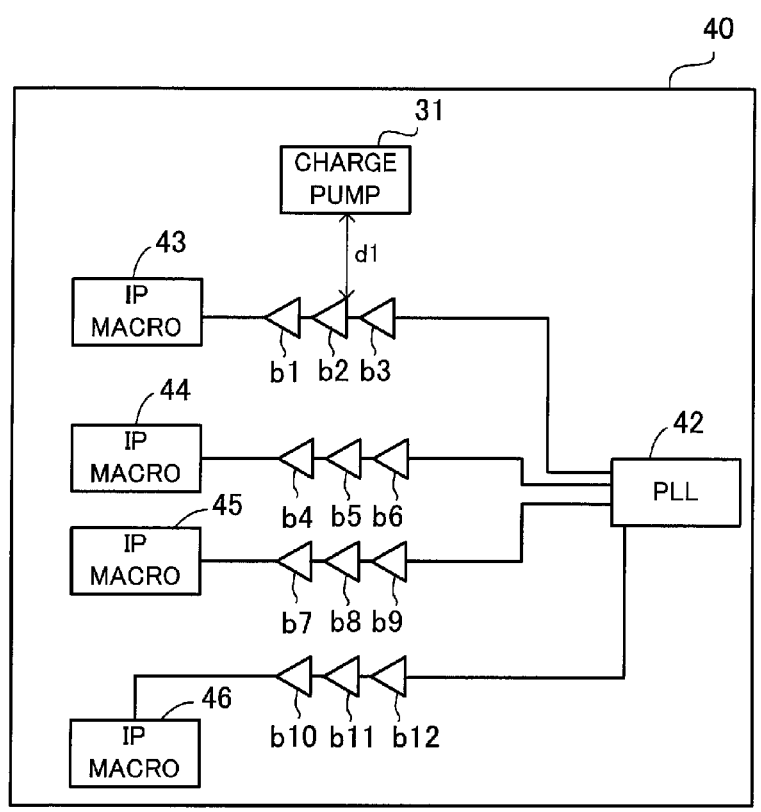
FIG. 7 is an example of the placement of IP macros.

FIG. 7 is an example of the placement of IP macros.

A charge pump 31, a PLL 42, and IP macros 43, 44, 45, and 46 are placed in a chip 40. The charge pump 31 and the PLL 42 are also IP macros. In an example in the second embodiment, however, a circuit section which accepts a clock from the PLL 42 that is a clock supply section is referred to as an IP macro.

Each of the IP macros 43 through 46 is a high-speed interface I/O, an ADC, a DAC, or the like. A clock path connected to the IP macro 43 includes clock buffers b1, b2, and b3. A clock is inputted from the PLL 42 to the IP macro 43 via the clock buffers b1 through b3. A clock path connected to the IP macro 44 includes clock buffers b4, b5, and b6. A clock is inputted from the PLL 42 to the IP macro 44 via the clock buffers b4 through b6. A clock path connected to the IP macro 45 includes clock buffers b7, b8, and b9. A clock is inputted from the PLL 42 to the IP macro 45 via the clock buffers b7 through b9. A clock path connected to the IP macro 46 includes clock buffers b10, b11, and b12. A clock is inputted from the PLL 42 to the IP macro 46 via the clock buffers b10 through b12.

The processor 21 does simulations for finding an increase of jitter on a clock path based on a corresponding amount of noise on the basis of the information regarding the relationship between distance from the charge pump 31 and an amount of noise found in step S11.

In order to find an increase of jitter on the clock path connected to the IP macro 43 which is based on an amount of noise, the processor 21 uses, for example, the distance d1 between the clock buffer b2 and the charge pump 31 which is shorter than the distance between the clock buffer b1 and the charge pump 31 and the distance between the clock buffer b3 and the charge pump 31. Then the processor 21 applies an amount of noise at the distance d1 to a transistor (not illustrated) included in each of the clock buffers b1 through b3, and finds an increase of jitter on the clock path connected to the IP macro 43. The processor 21 finds an increase of jitter not by the use of the distance between the clock buffer b1 and the charge pump 31, the distance between the clock buffer b2 and the charge pump 31, and the distance between the clock buffer b3 and the charge pump 31 but by the use of the shortest distance d1 at which an amount of noise in a back bias control signal is the largest. This reduces the number of times a calculation is performed.

Figure 8:
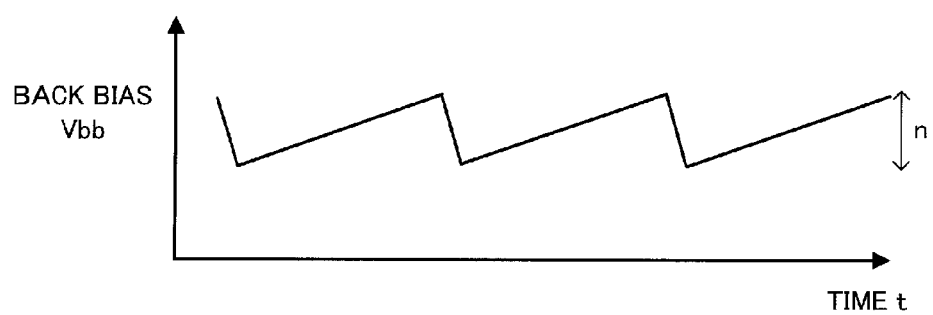
FIG. 8 is an example of a back bias including noise supplied to a clock buffer.

FIG. 8 is an example of a back bias including noise supplied to a clock buffer. In FIG. 8, a vertical axis indicates the magnitude of a back bias Vbb and a horizontal axis indicates time t.

The processor 21 generates a back bias Vbb having an amount of noise n (variation) corresponding to the distance d1 on the basis of the information found in step S11, and applies it to the transistors (not illustrated) included in the clock buffers b1 through b3. By doing so, the processor 21 finds an increase of jitter.

The processor 21 performs the same process on the clock paths connected to the IP macros 44 through 46.

Furthermore, the processor 21 changes the number of clock buffer stages and finds an increase of jitter.

Figure 9:
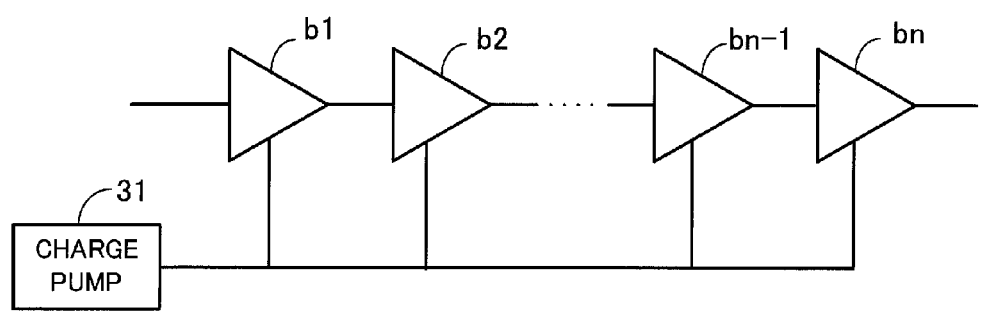
FIG. 9 is a view for describing an example of changing the number of clock buffer stages.

FIG. 9 is a view for describing an example of changing the number of clock buffer stages.

In FIG. 9, a charge pump 31 is connected to clock buffers b1, b2, ..., b(n−1), and bn connected in series. Jitter increases with an increase in the number of the clock buffers b1 through bn. The processor 21 changes the number of the clock buffers b1 through bn and does a simulation.

Figure 10:
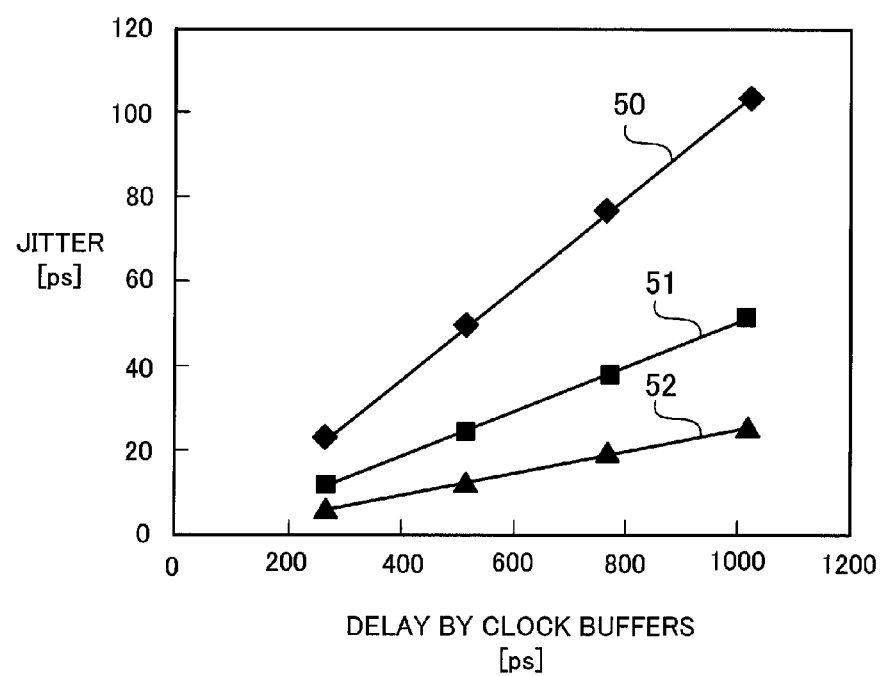
FIG. 10 is an example of results obtained by jitter analysis simulations.

FIG. 10 is an example of results obtained by jitter analysis simulations. In FIG. 10, a horizontal axis indicates a delay (ps) by clock buffers and a vertical axis indicates jitter (ps).

A characteristic 50 indicates the relationship between a delay by clock buffers and jitter at the time of a variation of a back bias Vbb being set to 60 mV. A characteristic 51 indicates the relationship between a delay by clock buffers and jitter at the time of a variation of a back bias Vbb being set to 30 mV. A characteristic 52 indicates the relationship between a delay by clock buffers and jitter at the time of a variation of a back bias Vbb being set to 15 mV.

As can be seen from FIG. 10, as a variation of a back bias Vbb increases, jitter increases. Furthermore, as a delay by clock buffers increases (as the number of clock buffer stages increases), jitter increases. An increase of jitter is found with a delay by clock buffers taken into consideration. By doing so, an amount of jitter in an input clock to an IP macro can be estimated more accurately and violation of a restriction on jitter can be prevented.

The processor 21 stores the distance (distance d1 indicated in FIG. 7, for example) between the charge pump and a clock buffer and the relationship between a delay by clock buffers and jitter in the HDD 23 or the RAM 22 on the basis of the above processing results.

Next, allowable input jitter calculations are performed in step S13 of the flow chart indicated in FIG. 4.

In this embodiment it is assumed that allowable input jitter indicates a value obtained by subtracting an amount of jitter which exists at the time of a clock outputted from a PLL reaching an IP macro from an allowable jitter value (restriction on jitter) in an input clock determined in advance for each IP macro.

The processor 21 does simulations on the basis of information regarding a PLL circuit and an allowable jitter value for an input clock to each IP macro stored in the HDD 23, the information generated in steps S11 and S12, and the like to find allowable input jitter.

FIG. 11 is an example of an allowable jitter value for an IP macro of each type.

FIG. 11 indicates an example of an allowable jitter value for each of IP macros IP1, 122, ..., and IP6. In the example of FIG. 11, an allowable jitter value for the IP macro IP1 is 50 ps, an allowable jitter value for the IP macro 122 is 156 ps, and an allowable jitter value for the IP macro IP6 is 2000 ps.

Each of the IP macros IP1 through 126 is, for example, an HDMI (High Definition Multimedia Interface), a USB (Universal Serial Bus) 2.0, a DAC, or a DDR3 SDRAM (Double-Data-Rate 3 Synchronous Dynamic Random Access Memory).

FIG. 12 is an example of a table indicative of results obtained by calculating allowable input jitter.

This table is made by the processor 21 and is stored in the HDD 23, the RAM 22, or the like. An example in which allowable input jitter for the IP macro 43 is found by the use of FIGS. 7 and 12 will now be described.

Allowable input jitter is calculated, for example, for different distances between the charge pump 31 and the PLL 42 and different distances between the PLL 42 and the IP macro 43.

An amount of jitter decreases with an increase in the distance between the charge pump 31 and the PLL 42 because an amount of noise in a back bias control signal supplied to a transistor included in the PLL 42 decreases. An amount of jitter produced according to the amount of noise is added to an increase of jitter on the clock path in the PLL 42 which is a clock supply section. By doing so, an amount of jitter in an input clock indicated in FIG. 12 can be found more accurately.

Figure 13:
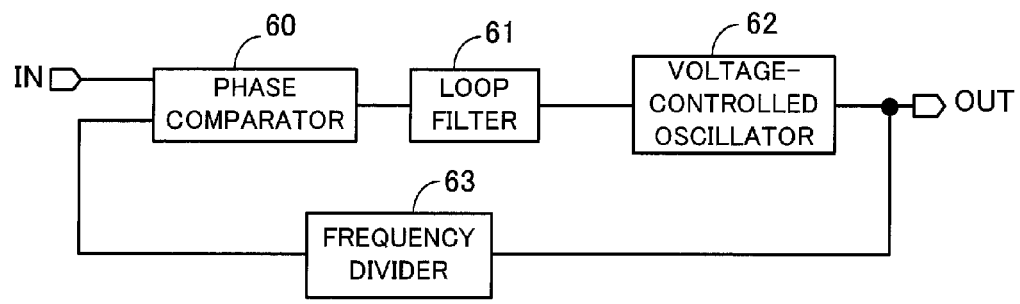
FIG. 13 is an example of a PLL.

FIG. 13 is an example of a PLL.

The PLL 42 includes a phase comparator 60, a loop filter 61, a voltage-controlled oscillator 62, and a frequency divider 63.

A reference clock inputted from an input terminal IN is inputted to the phase comparator 60 and its phase is compared with a phase of a feedback clock outputted from the frequency divider 63. A phase comparison result (voltage value) is supplied to the voltage-controlled oscillator 62 via the loop filter 61 and an oscillation frequency of a clock outputted from a terminal OUT is controlled by the voltage-controlled oscillator 62.

A back bias control signal is supplied from the charge pump 31 to transistors (not illustrated) included in the phase comparator 60, the loop filter 61, the voltage-controlled oscillator 62, and the frequency divider 63 included in the PLL 42.

As stated above, the back bias control signal includes noise an amount of which corresponds to distance from the charge pump 31.

In addition, in FIG. 12, an amount of jitter increases with an increase in the distance between the PLL 42 and the IP macro 43. The reason for this is as follows. The number of stages of the clock buffers b1 through b3 increases and a delay increases. Accordingly, as indicated in FIG. 10, jitter increases. In this case, an amount of jitter is calculated with the distance (distance d1 indicated in FIG. 7) between the clock buffers b1 through b3 and the charge pump 31 as a certain value.

In the example of FIG. 12, an allowable jitter value for the IP macro 43 is 200 ps. If the distance between the charge pump 31 and the PLL 42 is 2 mm and the distance between the PLL 42 and the IP macro 43 is 1 mm, an amount of jitter is 100 ps as a result of a simulation. In this case, allowable input jitter is 100 ps (=200 ps−100 ps). If the allowable input jitter is a positive value, that is to say, if the amount of jitter is smaller than the allowable jitter value, then there is a strong possibility that an input clock to the IP macro 43 meets a restriction on jitter. Accordingly, the processor 21 writes the determination result "OK" into a table like that indicated in FIG. 12.

Furthermore, in the example of FIG. 12, an amount of jitter is 150 ps as a result of a simulation if the distance between the charge pump 31 and the PLL 42 is 2 mm and the distance between the PLL 42 and the IP macro 43 is 2 mm. In this case, allowable input jitter is 50 ps (=200 ps−150 ps). The allowable input jitter is a positive value, so the processor 21 writes the determination result "OK" into the table like that indicated in FIG. 12.

In addition, in the example of FIG. 12, an amount of jitter is 200 ps as a result of a simulation if the distance between the charge pump 31 and the PLL 42 is 1 mm and the distance between the PLL 42 and the IP macro 43 is 1 mm. In this case, allowable input jitter is 0 ps (=200 ps−200 ps). The allowable input jitter is 0. Because of a factor and the like which are not considered in the simulation, there is a possibility that an input clock to the IP macro 43 does not meet the restriction on jitter. Accordingly, the processor 21 writes the determination result "error" into the table like that indicated in FIG. 12.

In addition, in the example of FIG. 12, an amount of jitter is 250 ps as a result of a simulation if the distance between the charge pump 31 and the PLL 42 is 1 mm and the distance between the PLL 42 and the IP macro 43 is 2 mm. In this case, allowable input jitter is −50 ps (=200 ps−250 ps). The allowable input jitter is a negative value, so an input clock to the IP macro 43 does not meet the restriction on jitter. Accordingly, the processor 21 writes the determination result "error" into the table like that indicated in FIG. 12.

On the basis of the table made in step S13, IP macro placement is determined in step S14 and clock buffer placement and routing are determined in step S15.

When the processor 21 places the IP macro 43 illustrated in FIG. 7, the processor 21 sets the distance between the PLL 42 and the IP macro 43 to 1 or 2 mm on the basis of the table like that indicated in FIG. 12, for example, in the case of the distance between the charge pump 31 and the PLL 42 being 2 mm.

Furthermore, even if placement which brings about the determination result "error" in the table indicated in FIG. 12 is performed, the distance between the clock buffers and the charge pump 31 is made longer than the distance used in step S13. By doing so, cases where a total amount of jitter decreases and where allowable input jitter becomes a positive value occur.

Restrictions are imposed on the placement of the IP macro, the charge pump, and the PLL. Accordingly, if a determination result is "error", then the processor 21 changes the placement of the clock buffers in step S15. Then the processor 21 finds allowable input jitter in step S16 to verify whether a determination result is "error" or "OK".

If a determination result is "error", then the processor 21 returns to step S13 and makes a change so as to obtain the determination result "OK". For example, the processor 21 replaces the PLL to reduce an increase of jitter based on an amount of noise in a back bias control signal, or reduces the number of clock buffer stages.

Figure 14:
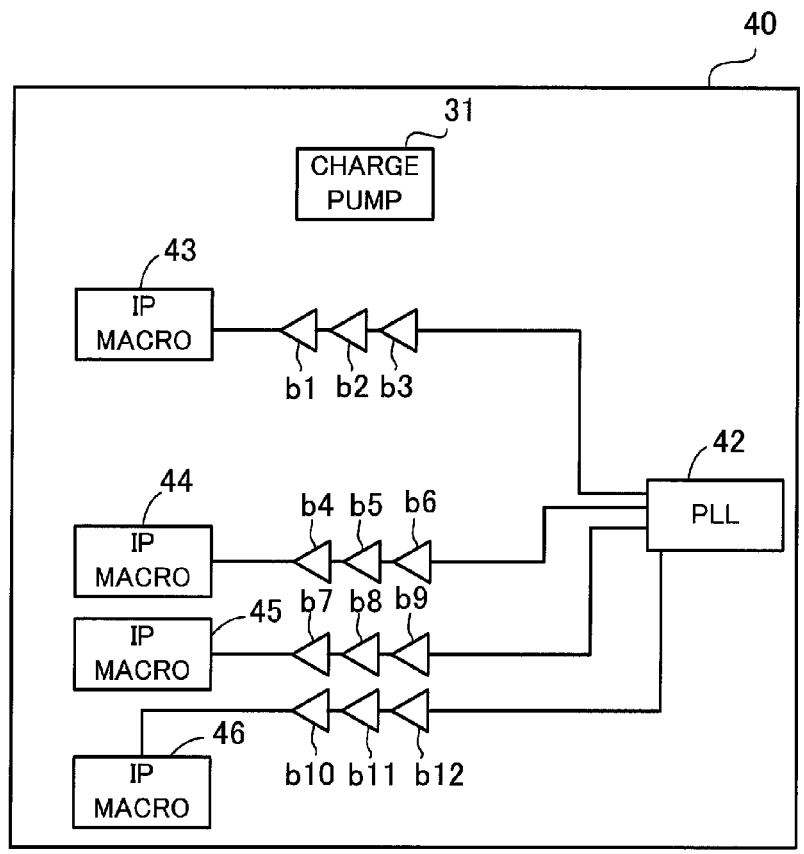
FIG. 14 is an example of placement in a chip optimized to obtain the determination result "OK".

FIG. 14 is an example of placement in a chip optimized to obtain the determination result "OK".

Compared with the example of placement in the chip 40 illustrated in FIG. 7, the IP macros 44 and 45 are distant from the charge pump 31 in FIG. 14. In addition, the clock buffers b4 through b6 placed between the IP macro 44 and the PLL 42 and the clock buffers b7 through b9 placed between the IP macro 45 and the PLL 42 are also distant from the charge pump 31 compared with the example of FIG. 7.

If the determination result "OK" is obtained in step S16, then the processor 21 performs clock routing (step S17) and automatic placement and routing (step S18). Then the processor 21 conducts various verifications such as a logic verification (step S19). If allowable verification results are obtained ("OK"), then the processor 21 ends the design process. If an allowable verification result is not obtained ("error"), then the processor 21 returns to, for example, step S17 (or step S18) and properly changes the routing or placement.

According to the above semiconductor device design method each circuit section and a clock path are placed with an amount of noise in a back bias control signal which varies according to distance from a charge pump taken into consideration. This prevents violation of a restriction on jitter which otherwise occurs due to noise included in a back bias control signal.

Furthermore, with the semiconductor device design method according to the second embodiment a circuit section and a clock path are placed with jitter taken into consideration. Therefore, a problem is detected at the time of the design of an SoC and a problem caused by the influence of jitter is solved before checking a really fabricated SoC. As a result, the number of processes performed over again in SoC development is small and an increase in design period is restrained.

One aspect of the semiconductor device design method and design apparatus according to the present invention have been described on the basis of the embodiments. However, each of these embodiments is a simple example and the present invention is not limited to these embodiments.

For example, the placement of an IP macro and a clock path may be determined with an amount of jitter based on an amount of noise in a back bias control signal supplied to the IP macro taken into consideration.

According to the disclosed semiconductor device design method and design apparatus violation of a restriction on jitter can be prevented.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A method for designing a semiconductor device including a circuit section, a clock path through which a clock is inputted to the circuit section, and a back bias control section which outputs at least a control signal for controlling a back bias of a transistor included in the clock path, the method comprising:
    finding, by a processor, a relationship between distance from the back bias control section which controls the back bias of the transistor and an amount of noise which indicates a variation of the back bias, wherein the variation varies according to the distance, in the control signal outputted from the back bias control section;
    finding, by the processor, an increase of jitter in the clock transmitted on the clock path connected to the circuit section on the basis of the relationship between the distance from the back bias control section and the amount of the noise, the increase of the jitter corresponding to the amount of the noise; and
    placing, by the processor, the circuit section and the clock path on the basis of the increase of the jitter and an allowable jitter value for the circuit section.

2. The method according to claim 1, wherein the increase of the jitter is found on the basis of an amount of a clock delay in a clock buffer included in the clock path and the amount of the noise.

3. The method according to claim 1, wherein the increase of the jitter is found on the basis of a number of stages of a plurality of clock buffers included in the clock path and the amount of the noise.

4. The method according to claim 1, wherein the increase of the jitter of the clock on the clock path is found on the basis of an amount of noise in a control signal outputted to a transistor included in a clock buffer which is at a shortest distance from the back bias control section among a plurality of clock buffers included in the clock path connected to the circuit section.

5. The method according to claim 1, wherein the increase of the jitter includes an amount of jitter which occurs on the basis of the amount of the noise corresponding to the distance from the back bias control section in a clock supply section, the clock supply section including a transistor whose back bias is controlled by the back bias control section and supplying the clock to the clock path.

6. The method according to claim 1, wherein the circuit section and the clock path are placed so that the amount of jitter in the clock inputted to the circuit section which is found on the basis of the increase of the jitter does not exceed the allowable jitter value.

7. A computer-readable, non-transitory record medium storing a program which makes a computer perform a process for designing a semiconductor device including a circuit section, a clock path through which a clock is inputted to the circuit section, and a back bias control section which outputs at least a control signal for controlling a back bias of a transistor included in the clock path, the process comprising:
    finding a relationship between distance from the back bias control section which controls the back bias of the transistor and an amount of noise which indicates a variation of the back bias, wherein the variation varies according to the distance, in the control signal outputted from the back bias control section;
    finding an increase of jitter in the clock transmitted on the clock path connected to the circuit section on the basis of the relationship between the distance from the back bias control section and the amount of the noise, the increase of the jitter corresponding to the amount of the noise; and
    placing the circuit section and the clock path on the basis of the increase of the jitter and an allowable jitter value for the circuit section.

8. The computer-readable, non-transitory record medium according to claim 7, wherein the increase of the jitter is found on the basis of an amount of a clock delay in a clock buffer included in the clock path and the amount of the noise.

9. The computer-readable, non-transitory record medium according to claim 7, wherein the increase of the jitter is found on the basis of a number of stages of a plurality of clock buffers included in the clock path and the amount of the noise.

10. The computer-readable, non-transitory record medium according to claim 7, wherein the increase of the jitter of the clock on the clock path is found on the basis of an amount of noise in a control signal outputted to a transistor included in a clock buffer which is at a shortest distance from the back bias control section among a plurality of clock buffers included in the clock path connected to the circuit section.

11. The computer-readable, non-transitory record medium according to claim 7, wherein the increase of the jitter includes an amount of jitter which occurs on the basis of the amount of the noise corresponding to the distance from the back bias control section in a clock supply section, the clock supply section including a transistor whose back bias is controlled by the back bias control section and supplying the clock to the clock path.

12. The computer-readable, non-transitory record medium according to claim 7, wherein the circuit section and the clock path are placed so that the amount of jitter in the clock inputted to the circuit section which is found on the basis of the increase of the jitter does not exceed the allowable jitter value.

13. A design apparatus comprising a processor configured to perform a process for designing a semiconductor device including a circuit section, a clock path through which a clock is inputted to the circuit section, and a back bias control section which outputs at least a control signal for controlling a back bias of a transistor included in the clock path,
    wherein the process includes:
        finding a relationship between distance from the back bias control section which controls a back bias of a transistor in a chip and an amount of noise which indicates a variation of the back bias, wherein the variation varies according to the distance, in the control signal outputted from the back bias control section;
        finding an increase of jitter in the clock transmitted on the clock path connected to the circuit section on the basis of the relationship between the distance from the back bias control section and the amount of the noise, the increase of the jitter corresponding to the amount of the noise; and
        placing the circuit section and the clock path on the basis of the increase of the jitter and an allowable jitter value for the circuit section.

14. The design apparatus according to claim 13, wherein the increase of the jitter is found on the basis of an amount of a clock delay in a clock buffer included in the clock path and the amount of the noise.

15. The design apparatus according to claim 13, wherein the increase of the jitter is found on the basis of a number of stages of a plurality of clock buffers included in the clock path and the amount of the noise.

16. The design apparatus according to claim 13, wherein the increase of the jitter of the clock on the clock path is found on the basis of an amount of noise in a control signal outputted to a transistor included in a clock buffer which is at a shortest distance from the back bias control section among a plurality of clock buffers included in the clock path connected to the circuit section.

17. The design apparatus according to claim 13, wherein the increase of the jitter includes an amount of jitter which occurs on the basis of the amount of the noise corresponding to the distance from the back bias control section in a clock supply section, the clock supply section including a transistor whose back bias is controlled by the back bias control section and supplying the clock to the clock path.

18. The design apparatus according to claim 13, wherein the circuit section and the clock path are placed so that the amount of jitter in the clock inputted to the circuit section which is found on the basis of the increase of the jitter does not exceed the allowable jitter value.

19. The method according to claim 1, wherein the relationship is found based on a parasitic capacitance of the transistor and a resistance which varies according to the distance.

20. The computer-readable, non-transitory record medium according to claim 7, wherein the relationship is found based on a parasitic capacitance of the transistor and a resistance which varies according to the distance.

21. The design apparatus according to claim 13, wherein the relationship is found based on a parasitic capacitance of the transistor and a resistance which varies according to the distance.

* * * * *